United States Patent [19]

Taylor et al.

[11] 4,436,222

[45] Mar. 13, 1984

[54] APPARATUS FOR DISPENSING CONTAINERS

[75] Inventors: Michael Taylor, Lower Norton, Nr. Warwick; Malcolm D. N. Withnall, Moreton Morrell, both of England

[73] Assignee: Mars Limited, London, England

[21] Appl. No.: 329,708

[22] Filed: Dec. 10, 1981

[30] Foreign Application Priority Data

Dec. 18, 1980 [GB] United Kingdom ............... 8040531

[51] Int. Cl.³ .............................................. B65H 3/24
[52] U.S. Cl. ..................................... 221/223; 221/274
[58] Field of Search ............... 221/221, 223, 272, 274, 221/297, 298, 289, 267, 268

[56] References Cited

U.S. PATENT DOCUMENTS

| | | | |
|---|---|---|---|
| 1,344,692 | 6/1920 | Hill | 221/267 X |
| 1,590,926 | 6/1926 | Cooley | 221/223 X |
| 2,235,855 | 3/1941 | Turnbull | 221/223 X |
| 3,181,728 | 5/1965 | West et al. | 221/221 |

*Primary Examiner*—Joseph J. Rolla
*Assistant Examiner*—Kevin P. Shaver
*Attorney, Agent, or Firm*—Curtis, Morris & Safford

[57] ABSTRACT

An apparatus for dispensing containers, in particular disposable cups, from a stack. The apparatus has two jaw assemblies, each having a catch member and a lever member pivotable about horizontal axes between a first rest position in which the stack of containers is supported by the lever member and a second dispensing position in which the lowermost container is pulled from the stack by the lever member while it is supported by the catch member, and the inner edges of the catch member and lever member are formed as concave segments of a circle to provide good support and even loading on the containers during operation.

7 Claims, 6 Drawing Figures

APPARATUS FOR DISPENSING CONTAINERS

The present invention relates to an apparatus for dispensing containers from a stack.

Such apparatus is used particularly to dispense disposable cups for hot or cold drinks, using a nesting stack of cups. The dimensions of these cups vary due to manufacturing tolerances and they can become damaged or distorted due to poor handling or environmental conditions. The apparatus should be able to accept these variations and still reliably dispense the cups one at a time without jamming.

Also in the type of drinks preparation system known as the in-cup system where an appropriate dried powder is stored in each cup and the drink is made by simply pouring hot water into the cup, a stack of cups can be of considerable weight and the dispensing apparatus should therefore be strong enough to support this stack whilst also being cheap to manufacture and reliable in operations.

According to the present invention there is provided apparatus for dispensing containers from a stack, comprising a plurality of jaw assemblies evenly spaced around a common vertical axis, each jaw assembly having a catch member and a lever member pivotable about horizontal axes between a first rest position in which the catch member is pivoted upwards away from the common axis to allow a stack of containers to pass it and rest on a lower support surface of the lever member and a second dispensing position in which an upper support surface of the catch member is positioned to support the stack of containers and the lever member is pivoted downwards away from the common axis to allow the lowermost of the stack of containers to pass it, wherein the inner edges of the upper and lower support surfaces form concave segments of a circle of substantially the same radius.

This gives an area of contact between the respective upper and lower support surfaces and the containers, which enables the apparatus to support stacks of "in-cup" containers and allows for variations in the dimensions of the containers. Preferably each lever member has an upper pressure surface opposed to and spaced from its lower support surface so as to apply downward pressure to the top of the lowermost of the stack of containers when in the said second position, the inner edges of the upper pressure surfaces forming concave segments of a circle.

This spreads the load on the lowermost of the stack of containers so as to reduce damage if a large pressure is required to separate it such as when cups of the interlocking type have been forced together during loading of the apparatus.

An apparatus for dispensing containers, constructed in accordance with the present invention, will now be described by way of example and with reference to the accompanying drawings in which.

Figure 1:
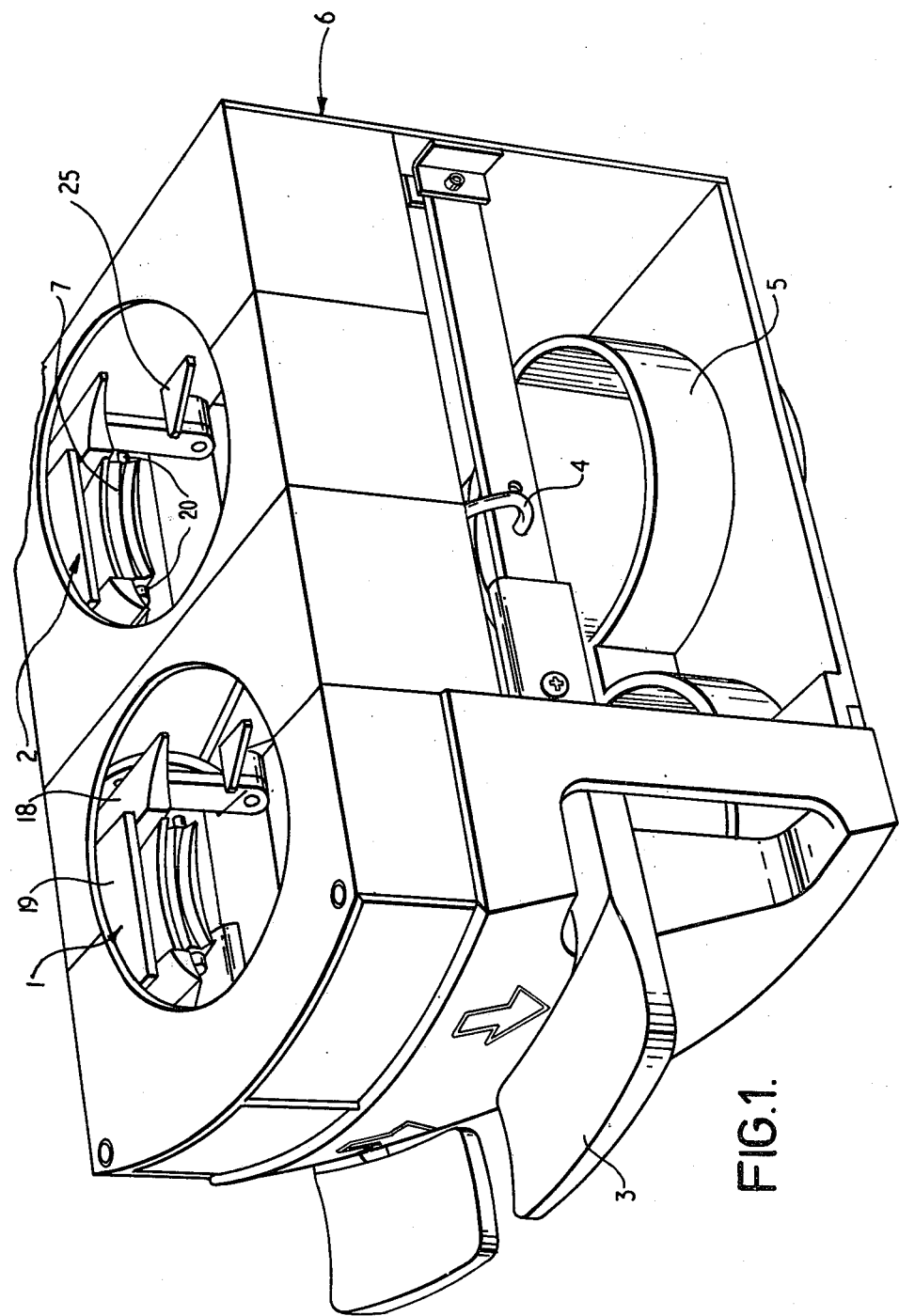
FIG. 1 is a top perspective view of the apparatus.

Referring to FIG. 1, the apparatus consists of two similar cup dispensing mechanisms 1, 2 which are capable of independent operation and are positioned one behind the other in a housing 6. Each dispensing mechanism is operated by a separate handle 3 pivoted at the back of the housing and connected to the dispensing mechanism by a hook 4 which engages in a hole in the arm of the handle. A return spring (not shown) urges each handle upwards towards the rest position shown in FIG. 1. Below each dispensing mechanism is a tube 5 having a ledge running part way round the inside of its lower edge (not shown) so as to catch the rim of a cup dispensed by the apparatus and present it for removal by the operator.

The operation of each dispensing mechanism is essentially the same and can be seen with reference to FIGS. 2 to 6 which show the operation of the front mechanism 1. The cup dispensing mechanism comprises two jaw assemblies disposed on diametrically opposite sides of the vertical path along which is to pass the stack of cups to be dispensed. Each jaw assembly consists of a lever member 7 and a catch member 8 separately pivoted in the housing 6 about horizontal axes 9 and 10 respectively.

Each lever member 7 has a horizontally extending recess 11 in its curved free end, between a lower support surface 12 and an upper pressure surface 13. A link rod 14 links a crank arm 15 on one lever member 7 to a corresponding crank arm 16 on the diametrically opposite lever member 7 so that clockwise angular movement of one lever member about its pivot axis 9 causes equal anticlock-wise angular movement of the other lever member about its pivot axis 9.

Each catch member comprises two pivoted legs 17 having their free ends 18 cranked inwards towards the path of the stack of cups and joined by an intermediate element 19. The cranked free ends 18 are curved and lie either side of the curved free end of the corresponding lever member 7, stops 20 carried by the lever member lying underneath the cranked free ends 18 of the catch member. A spring 21 biases each of the diametrically opposed catch members inwardly about its pivot axis 10. The crank arm 15 of one of the lever members is connected to the arm of the handle for operating the dispensing mechanism by means of the hook 4, which causes the lever member to rotate as the handle is pressed down from its rest position.

Figure 2:
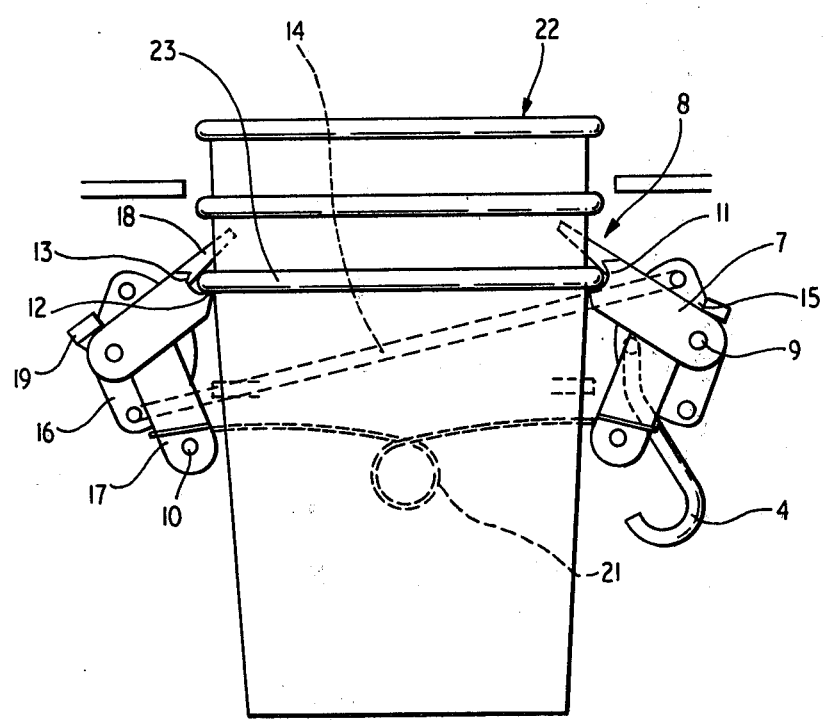
FIGS. 2, 3 and 4 are diagrammatic side views of the dispensing mechanism of the apparatus in various positions.
Figure 5:
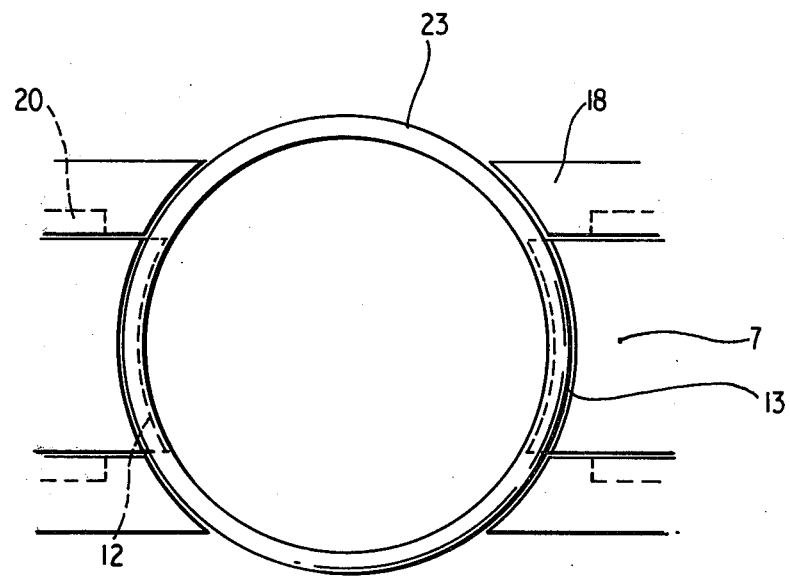
FIGS. 5 and 6 are diagrammatic top views of the dispensing mechanism in different positions.

When the handle 3 is in its rest position the lever members 7 are held in an upwardly tilted position as shown in FIGS. 2 and 5. The stops 20 carried by the lever members 7 then hold the cranked free ends 18 of the catch members upward to allow a stack of cups 22 to be loaded into the mechanism from above, with the underside of the rim 23 of the lowest cup resting on the lower support surfaces 12 of the lever members 7. These lower support surfaces 12 are shaped so that when the lever members 7 are in the position shown in FIG. 2 they are horizontal and their inner edges are segments of a circle of radius substantially equal to that of the outside of a cup immediately below its rim, as seen in FIG. 5. This shaping distributes the loading on the lever members from the weight of the stack of cups, reducing the risk of the cups falling down through the mechanism.

Figure 3:
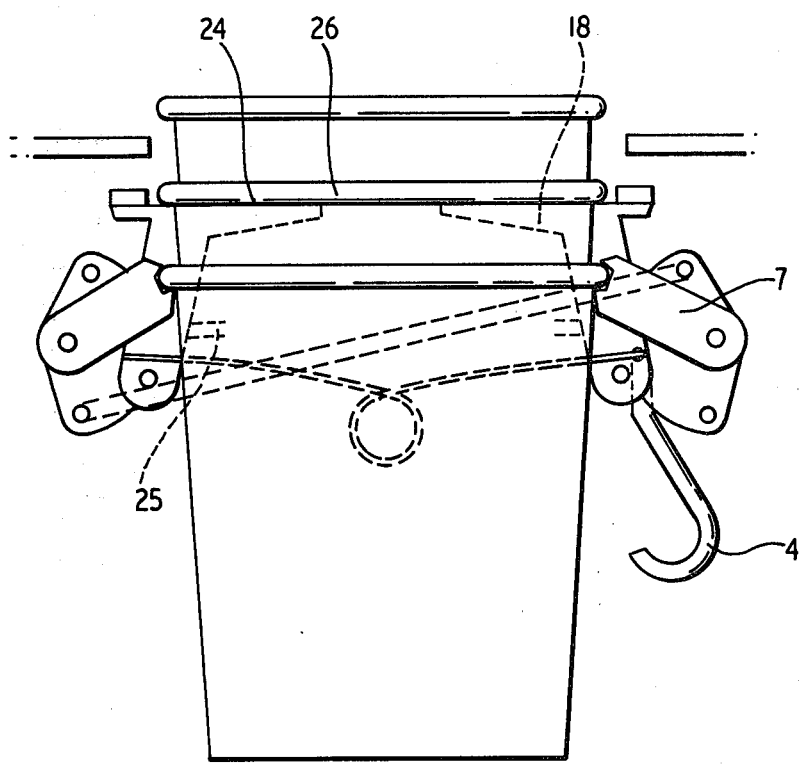
Figure 6:
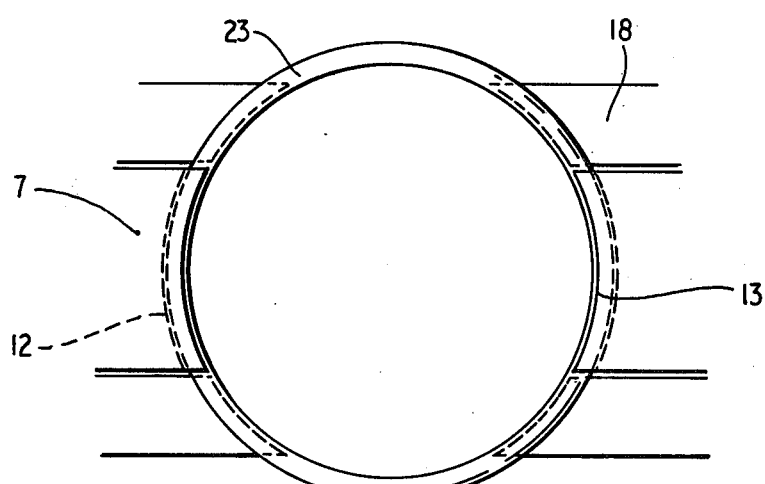

Manual depression of the handle 3 causes the hook 4 to be pulled downwards with a consequent downward and inward pivoting of the lever members 7. As seen in FIG. 3 this allows the free ends 18 of the catch members to be urged inwards by the spring 21 until their upper support surfaces 24 are horizontal, the inner edges of the free ends 18 being segments of a circle of radius substantially equal to that of a cup immediately below its rim, as seen in FIG. 6. Further rotation of the catch members is prevented by stops 25 attached to the housing 6. The pivoting of the lever members 7 allows the stack of cups to move downwards until the underside of the rim 26 of the next cup above the lowermost cup rests on the upper support surfaces 24 of the free ends of the catch members 8.

Figure 4:
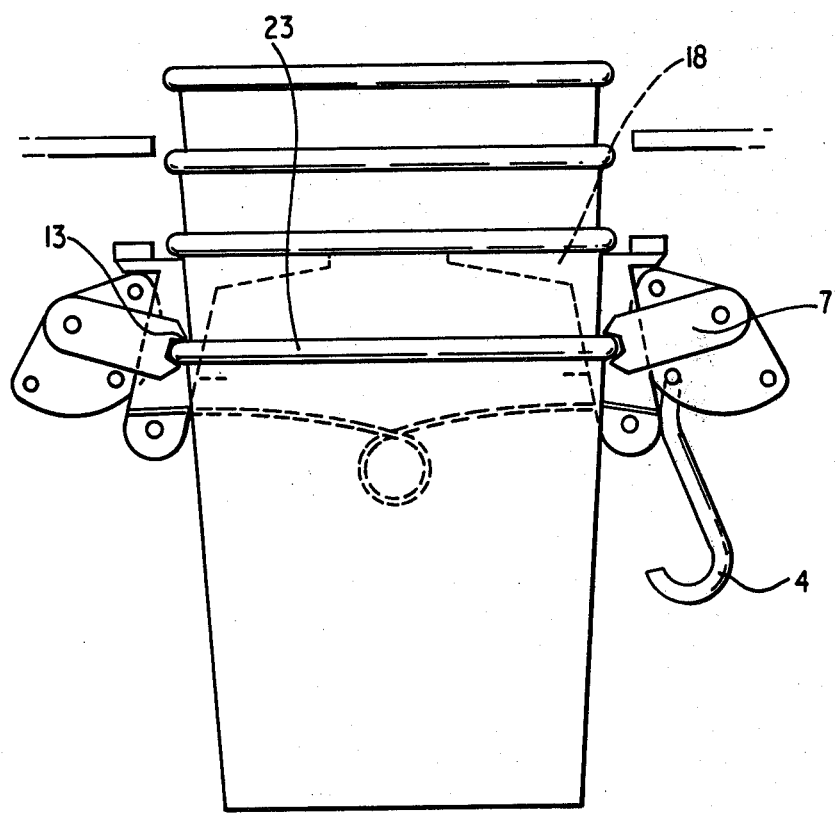

Continued rotation of the lever members 7 disengages their lower support surfaces 12 from the underside of the rim of the lowermost cup, the stack of cups being now supported by the upper support surfaces 24, and causes the upper pressure surfaces 13 to press on the upper side of the rim 23 of the lowermost cup, as seen in FIGS. 4 and 6. The pressure pries this cup away from the stack and the separated cup falls into the tube 5 (FIG. 1). The upper pressure surfaces 13 are so shaped that when the lever members 7 are in the position shown in FIG. 4 they are horizontal and their inner edges are segments of a circle. This shaping distributes the pressure on the cup rim and so enables a sufficient axial force to be applied to separate cups which may have been jammed together without damaging the cup rims. As seen in FIG. 6 the circle is of radius substantially equal to the radius of a cup in the region immediately below its rim.

Releasing the handle 3 allows it to return to its rest position and the resultant upwards and outwards movement of the lever members 7 causes the free ends 18 of the catch members to be engaged by the stops 20 and moved outwards and away from the stack of cups allowing the stack to drop until the lowermost cup is supported by its rim on the lower support surfaces of the lever members. The operation sequence is then complete and the mechanism is at rest ready for the next operation.

The rear dispensing mechanism 2 operates in a corresponding manner when the other handle is depressed, the hook 4 being on the opposite crank arm 16. Other means may alternatively be used to operate the mechanism such as an electrical motor driving an eccentric linked to one of the crank arms 15, 16.

Whereas a pair of diametrically opposed jaw assemblies have been described, it is possible to have more than two jaw assemblies evenly spaced around the path of the stack of cups, but the synchronisation of their operation would be more difficult to achieve.

We claim:

1. Apparatus for dispensing containers from a stack, comprising a plurality of jaw assemblies evenly spaced around a common vertical axis, each jaw assembly having a catch member and a lever member pivotable about horizontal axes between a first rest position in which the catch member is pivoted upwards away from the common axis to allow a stack of containers to pass it and rest on a lower support surface of the lever member and a second dispensing position in which an upper support surface of the catch member is positioned to support the stack of containers and the lever member is pivoted downwards away from the common axis to allow the lowermost of the stack of containers to pass it, wherein the inner edges of the upper and lower support surfaces form concave segments of a circle of substantially the same radius as the containers, each said lever member having an upper pressure surface opposed to and spaced from its lower support surface so as to apply downward pressure to the top of the lowermost of the stack of containers when in the said second position, the inner edges of the upper pressure surfaces forming concave segments of a circle and wherein the upper pressure surfaces are horizontal when the lever members are in their second position.

2. Apparatus according to claim 1 wherein the lower support surfaces are horizontal when the lever members are in their first position and the upper support surfaces are horizontal when the catch members are in their second position.

3. Apparatus according to claim 1 wherein each catch member comprises two legs each pivoted at one end and with their free ends cranked towards the common axis to form the upper support surface, the corresponding lever member being disposed between the two legs.

4. Apparatus according to claim 1 wherein each lever member can abut against the corresponding catch so as to pivot the catch member away from the common axis when the lever member is returned to its first position from its second position.

5. Apparatus according to claim 4 including bias means urging the catch members inwards towards the common axis and a stop member positioned adjacent each catch member so as to limit the inward movement of the catch member when in the second position.

6. Apparatus according to claim 1 wherein two jaw assemblies are provided on diametrically opposed sides of the common axis.

7. Apparatus according to claim 6 wherein the two jaw assemblies are mechanically linked and operated in synchronism by a crank arm having an operating handle on its free end.

* * * * *